A. J. Palmer,
Bread Machine.

N° 43,791.        Patented Aug. 9, 1864.

Witnesses;
Wm. P. McNamara
J. P. Hall

Inventor;
A. Judson Palmer
Per Munn & Co.
Att'ys

UNITED STATES PATENT OFFICE.

A. JUDSON PALMER, OF BROOKLYN, NEW YORK.

IMPROVED DOUGH-KNEADER.

Specification forming part of Letters Patent No. 43,791, dated August 9, 1864.

*To all whom it may concern:*

Be it known that I, A. JUDSON PALMER, of Brooklyn, in the county of Kings and State of New York, have invented a new and Improved Device for Kneading Dough; and I do hereby declare that the following is a full, clear, and exact description thereof, which will enable others skilled in the art to make and use the same, reference being had to the accompanying drawings, forming part of this specification, in which—

Figure 1:
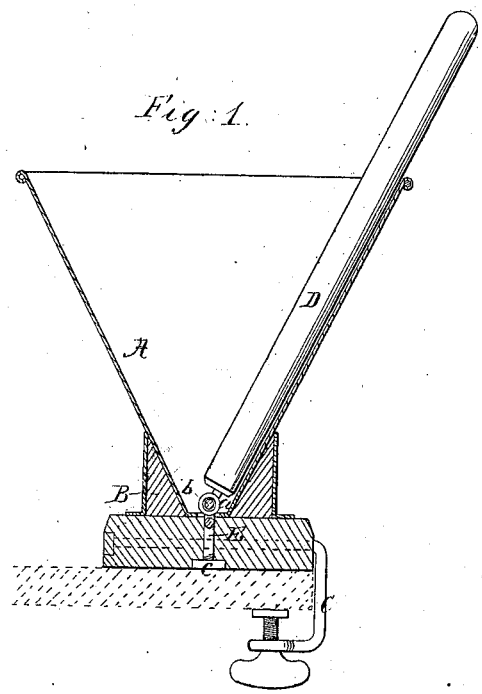
Figure 2:
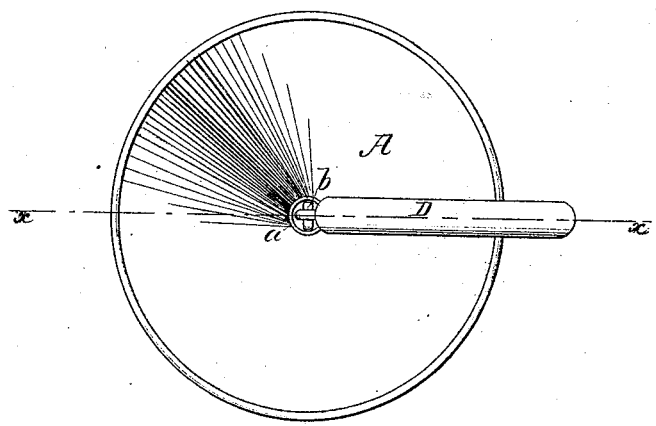

Figure 1 represents a vertical central section of my invention, taken in the line $x\ x$, Fig. 2; Fig. 2, a plan or top view of the same.

Similar letters of reference indicate like parts.

This invention relates to a new and improved device for kneading dough, designed for domestic use, and to facilitate the work and greatly diminish the labor thereof.

The invention consists in the employment or use of a conical hopper in connection with a stirrer or kneading-bar arranged within the hopper, as hereinafter fully set forth.

A represents a conical hopper, which may be constructed of metal or wood—tinned plate will probably be most generally used for the purpose. This hopper is fitted at its lower end into a wooden block, B, which has a clamp, C, attached to it for the purpose of securing the device to a bench, table, or any suitable support. (See Fig. 1.)

D represents a bar, which may be of wood and of cylindrical form. This bar is fitted within the hopper A, and it has a metal eye, $a$, at its lower end, in which a similar eye, $b$, is fitted, the eye $b$ being at the upper end of a screw, E, which passes down into the block B and is fitted in a nut, $c$, in the bottom of the same. Two eyes, $a\ b$, form a universal joint for connecting the bar D to the bottom of the hopper, said joint admitting of the bar being turned all around within the hopper. The flour, water, and yeast are all placed within the hopper, and all well incorporated together, and the kneading operation thoroughly performed by turning the bar D around within the hopper A. This may be done without soiling the hands, and far more expeditiously and thoroughly than by the ordinary tedious hand process, and when the dough is well kneaded the device may be placed by the stove to favor the raising of the dough.

The device may be constructed at a small cost, sufficiently so to place it within the reach of every family.

I claim as new and desire to secure by Letters Patent—

The conical hopper A, in combination with the stirrer or kneading-bar B, arranged within the hopper, to operate substantially as and for the purpose herein set forth.

A. J. PALMER.

Witnesses:
J. P. HALL,
M. M. LIVINGSTON.